United States Patent [19]

Bearden, Jr. et al.

[11] Patent Number: 5,053,376

[45] Date of Patent: Oct. 1, 1991

[54] METHOD OF PREPARING A SULFIDED MOLYBDENUM CATALYST CONCENTRATE

[75] Inventors: Roby Bearden, Jr.; Clyde L. Aldridge, both of Baton Rouge, La.

[73] Assignee: Exxon Research & Engineering Company, Florham Park, N.J.

[21] Appl. No.: 532,720

[22] Filed: Jun. 4, 1990

[51] Int. Cl.$^5$ .................... B01J 27/051; B01J 27/047; C10G 47/06; C10G 1/08

[52] U.S. Cl. .................... 502/150; 208/108; 208/421; 502/211; 502/219; 502/220; 502/221; 502/222

[58] Field of Search ................ 502/150, 216, 219–222; 208/108

[56] References Cited

U.S. PATENT DOCUMENTS

| | | | |
|---|---|---|---|
| 2,232,909 | 2/1941 | Gohr | 502/220 |
| 4,295,995 | 10/1981 | Bearden, Jr. et al. | 502/182 |
| 4,719,002 | 1/1988 | Mayer et al. | 208/108 |
| 4,740,295 | 4/1988 | Bearden, Jr. et al. | 208/108 |
| 4,740,489 | 4/1988 | Bearden, Jr. et al. | 502/150 |
| 4,943,547 | 7/1990 | Seamans et al. | 502/150 |

Primary Examiner—Paul E. Konopka
Attorney, Agent, or Firm—Henry E. Naylor

[57] ABSTRACT

A method for preparing a sulfided molybdenum catalyst concentrate which method comprises: (a) forming a precursor catalyst concentrate by mixing together: (i) a hydrocarbonaceous oil comprising constituents boiling above about 1050° F.; (ii) a metal compound, said metal being selected from the group consisting of Groups II, III, IV, V, VIB, VIIB, and VIII of the Periodic Table of the Elements, in an amount to provide from about 0.2 to 2 wt. % metal, based on said hydrocarbonaceous oil; and (iii) elemental sulfur in an amount such that the atomic ratio of sulfur to metal is from about 1/1 to 8/1; and (b) heating the mixture to an effective temperature to produce a catalyst concentrate.

19 Claims, 4 Drawing Sheets

FIGURE 3

EFFECT OF PREFORMATION TEMPERATURE (STEP D) ON CATALYST CONCENTRATE EFFECTIVENESS

FIGURE 4

000# METHOD OF PREPARING A SULFIDED MOLYBDENUM CATALYST CONCENTRATE

FIELD OF THE INVENTION

This invention relates to an improved method of preparing a sulfided catalyst concentrate useful for processes such as hydroconversion of heavy hydrocarbonaceous feedstocks. The method uses elemental sulfur as the sulfiding source.

BACKGROUND OF THE INVENTION

There is substantial interest in the petroleum industry for converting heavy hydrocarbonaceous feedstocks to lower boiling liquids. One type of process suitable for hydroconversion of heavy feedstocks is a slurry process using a catalyst prepared in a hydrocarbon oil from a thermally decomposable, metal compound catalyst precursor. The catalyst is formed in situ in the hydroconversion zone. See for example, U.S. Pat. Nos. 4,226,742 and 4,244,839.

It is also known to use such catalysts in hydroconversion processes (i.e., coal liquefaction) in which coal particles are slurried in a hydrocarbonaceous material. See, for example, U.S. Pat. Nos. 4,077,867 and 4,111,787.

Further, U.S. Pat. Nos. 4,740,295 and 4,740,489, both of which are incorporated herein by reference, teach a method wherein the catalyst is prepared from a phosphomolybdic acid precursor concentrate. The precursor concentrate is sulfided prior to the final catalyst formation. This presulfiding step is taught to produce a catalyst having greater control over coke formation. The sulfiding agent in these two patents requires a hydrogen-sulfide containing gas or a hydrogen-sulfide precursor and the resulting catalyst concentrate is used for hydroconversion of heavy hydrocarbonaceous materials to lower boiling products.

The term "hydroconversion" with reference to a hydrocarbonaceous oil, is used herein to designate a catalytic process conducted in the presence of hydrogen in which at least a portion of the heavy constituents of the oil is converted to lower boiling products. The simultaneous reduction of the concentration of nitrogenous compounds, sulfur compounds and metallic constituents of the oil may also result.

The term "hydroconversion" with reference to coal is used herein to designate a catalytic conversion of coal to normally liquid products in the presence of hydrogen.

All boiling points referred to herein are atmospheric pressure equivalent boiling points unless otherwise specified.

It has been found that introducing a catalyst precursor as a concentrate in a hydrocarbonaceous oil into a hydroconversion zone containing a heavy hydrocarbonaceous chargestock has certain advantages when compared with a process wherein the catalyst precursor is introduced into the hydroconversion zone without first forming a concentrate; that is, by introducing the catalyst precursor directly into the feed in the reactor. The advantages include: (i) ease of mixing the precursor with a small stream instead of the whole feed; (ii) the ability to store the precursor concentrate for future use and/or activity certification; and (iii) the ability to use a hydrocarbonaceous oil, other than the feedstock, as dispersing medium for the catalyst precursor, which hydrocarbonaceous oil other than the feedstock can be more optimum for developing catalyst activity.

Further, it has also been found that converting a catalyst precursor concentrate to a catalyst concentrate comprised of solid catalyst particles dispersed in a hydrocarbonaceous oil and subsequently introducing a portion of this catalyst concentrate into the hydrocarbonaceous chargestock to be hydroconverted, with or without coal, will provide certain additional advantages, such as greater flexibility of conditions. Such advantages include: (i) use of higher concentrations of sulfiding agent than those concentrations that could practically be used to treat the total chargestock; (ii) flexibility of heat balance; and (iii) economy of energy. Treatment of only the catalyst precursor concentrate to produce the catalyst instead of treating the entire feedstock containing the catalyst precursor, permits reduction of equipment size. Furthermore, preparing a catalyst concentrate permits storage of the catalyst concentrate for use as needed on-site or to send to another site.

It has also been found, and is claimed herein, that when elemental sulfur is used as the sulfiding agent in the preparation of the catalyst concentrate of this invention, a critical range of atomic ratio of sulfur to metal of the metal compound exits. This critical range is from about 1/1 to 8/1 sulfur to metal. Use of elemental sulfur has the advantages of ease and simplicity of catalyst preparation. It also has the advantage of being less hazardous because there is no need to handle hydrogen sulfide under elevated pressures, as is required by prior art processes.

SUMMARY OF THE INVENTION

In accordance with the present invention, there is provided a method for preparing a sulfided catalyst concentrate which method comprises:

(a) forming a catalyst precursor concentrate by mixing together: (i) a hydrocarbonaceous oil comprising constituents boiling above about 1050° F.; (ii) a metal compound, said metal being selected from the group consisting of Groups IVB, VB, VIB, VIIB, and VIII, of the Periodic Table of the Elements, in an amount to provide from about 0.2 to 2 wt. % metal, based on said hydrocarbonaceous oil; and (b) heating the mixture to an effective temperature to produce a catalyst concentrate;

wherein elemental sulfur is used as a presulfiding agent in an amount such that the atomic ratio of sulfur to metal is from about 1/1 to 8/1.

In preferred embodiments of the present invention, the metal compound is an aqueous solution of phosphomolybdic acid and the precursor concentrate is dried prior to the heating step.

In other preferred embodiments of the present invention, the hydrocarbonaceous oil of step (i)(a) is a blend of a lighter oil with at least 10 wt. % heavier oil, said lighter oil boiling below about 1050° F. and said heavier oil boiling above about 1050° F.

In yet other preferred embodiments of the present invention, the amount of elemental sulfur is such that it will provide an atomic ratio of elemental sulfur to metal of about 2/1 to 7/1 and molybdenum is present in the mixture of step (i) in an amount ranging from about 0.2 to 1.0 wt. % and the heating is conducted at a temperature from about 530° F. to about 800° F.

In another preferred embodiment of the present invention, the sulfur is dissolved in a hydrocarbonaceous oil prior to introduction of the phosphomolybdic acid.

In still another preferred embodiment of the present invention, the elemental sulfur is added as a concentrate in hydrocarbonaceous oil and is added to the precursor concentrate: (i) prior to introduction of the precursor into the heating zone of step (b), or (ii) in the heating zone.

In other preferred embodiments of the present invention, the molybdenum containing precursor used to prepare the catalyst concentrate can comprise other oil soluble compounds such as molybdenum naphthenate or molybdenyl bisacetylacetonate.

DETAILED DESCRIPTION OF THE INVENTION

Figure 1:
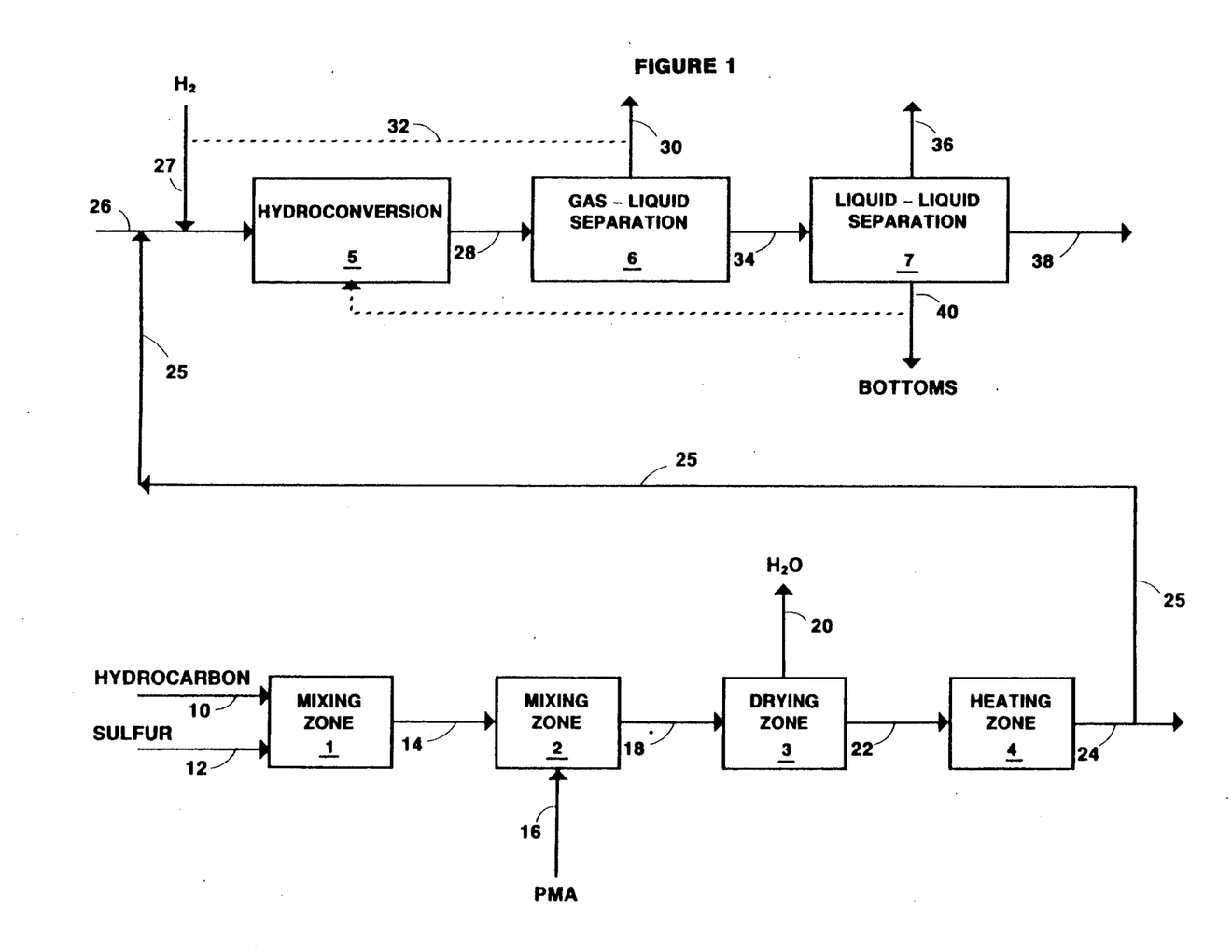
FIG. 1 is a schematic flow plan of one embodiment of the present invention.

FIG. 1 hereof represents one of the preferred embodiments for carrying out the instant invention wherein an aqueous solution of phosphomolybdic acid is used as the metal compound. The term "phosphomolybdic acid" is used herein to designate aqueous solutions of the reaction product of $MoO_3$ with dilute phosphoric acid in which the phosphorus to molybdenum atomic ratio ranges from 0.083 to 2, preferably from 0.083 to 1 and most preferably from 0.083 to 0.5. Said solutions can contain one or more phosphomolybdic acid species such as the 12-molybdophosphoric acid and the dimeric 18-molybdophosphoric acid. Moreover, the crystalline 12 and 18 acids can be used to prepare the water solutions of phosphomolybdic acid used in the process of this invention. If such crystalline phosphomolybdic acids are used, additional $H_3PO_4$ or other phosphorus compounds may be added to the solution to provide the desired P/Mo ratio. Phosphomolybdic acids are described in *Topics In Current Chemistry No.* 76, published by Springer-Verlag of New York, pp. 1-64. 1978; which is incorporated herein by reference.

Referring now to FIG. 1 hereof, a hydrocarbonaceous oil is introduced by line 10 into mixing zone 1. Suitable hydrocarbonaceous oils for introduction into mixing zone 1 include hydrocarbonaceous oils comprising constituents boiling above 1050° F., preferably having at least 10 wt. % constituents boiling above 1050° F., such as crude oils, atmospheric residua boiling above 630° F., and vacuum residua boiling above 1050° F. Preferably, the hydrocarbonaceous oil has an initial boiling point above at least 650° F. and comprises asphaltenes and/or resins. Most preferably, the hydrocarbonaceous oils comprise a lighter boiling oil boiling below about 1050° F. and a heavier oil boiling above about 1050° F. in a blend comprising at least about 22 weight percent materials boiling above 1050° F. Preferred concentrations of the 1050+° F. fraction in the blend include from about 22 to 85 weight percent heavier oil, more preferably from about 30 to 85 weight percent heavier oil, still more preferably about 40 to 85 weight percent heavier oil, and most preferably about 45 to 75 weight percent heavier oil, based on the total weight of the blend(mixture of oils). The light oil may be a gas oil and heavier oil may be a vacuum residuum. Alternatively, an atmospheric residuum having the appropriate amount of desired constituents may be used as the oil of line 10.

The hydrocarbonaceous oil carried by line 10 may be derived from any source, such as petroleum, tar sand oil, shale oil, liquids derived from coal liquefaction processes, and mixtures thereof. Generally, these oils have a Conradson carbon content ranging from about 5 to about 50 wt. % (as to Conradson carbon, see ASTM test D-189-65).

Elemental sulfur, either as the sublimed powder or as a concentrated dispersion of sublimed powder, such as commercial Flowers of sulfur, in heavy hydrocarbonaceous oil, is introduced into mixing zone 1 by line 12. Allotropic forms of elemental sulfur, such as orthorhombic and monoclinic sulfur are also suitable for use herein. The preferred physical form of sulfur is the sublimed powder (flowers of sulfur), although sulfur may also be introduced as molten sulfur and as sulfur vapor. The amount of sulfur added into mixing zone 1 is such that the atomic ratio of sulfur to molybdenum is from about 1/1 to 8/1, preferably from about 2/1 to 7/1 and more preferably from about 3/1 to 6/1. Alternatively, sulfur can be added at any point in the catalyst concentrate preparation procedure as long as it is not contacted with an aqueous solution prior to it being introduced into oil. For example, it can be added as a concentrate in a hydrocarbonaceous oil after the precursor concentrate has been dried. It can also be introduced into the heating zone during formation of the catalyst concentrate. If the elemental sulfur is added as a concentrate in oil, the amount of sulfur in the concentrate is such that it still meet the aforementioned requirements pertaining to atomic ratio of sulfur to metal. That is, the atomic ratio of sulfur to metal of the metal compound will remain 1/1 to 8/1.

The mixture from mixing zone 1 is passed to mixing zone 2 via line 14 where an appropriate metal compound, such as an aqueous solution of phosphomolybdic acid (catalyst precursor) is also introduced, via line 16. A sufficient amount of the aqueous phosphomolybdic acid solution is introduced into mixing zone 2 to provide from about 0.2 to 2 wt. %, preferably from about 0.2 to 1 wt. %, more preferably 0.3 to 1 wt. % molybdenum from the phosphomolybdic acid, calculated as elemental molybdenum based on the hydrocarbonaceous oil. The resulting mixture is a water-containing catalyst precursor concentrate (i.e., wet catalyst precursor concentrate). The wet catalyst precursor concentrate is removed from mixing zone 2 by line 18 and passed to drying zone 3 in which water is removed from the wet catalyst precursor concentrate by any suitable manner. Such a suitable manner includes heating the water-containing catalyst precursor concentrate to a temperature sufficient to vaporize the water, for example, at a temperature ranging from 212° to 300° F. The water is removed from drying zone 3 by line 20. The dried catalyst precursor concentrate is removed from drying zone 3 and is passed via line 22 to heating zone 4.

In heating zone 4, the dried catalyst precursor concentrate is heated, in the absence of added hydrogen, to a temperature of at least about 530° F., preferably at a temperature ranging from about 530° F. to about 800° F., more preferably from about 600° F. to about 775° F., and most preferably from 625° F. to about 750° F. The total pressure in heating zone 4 will range from about 0 psig to about 500 psig, preferably from about 0 psig to about 100 psig. The precursor concentrate is heated for an effective amount of time. By "effective amount of time", we mean that amount of time needed to convert the catalyst precursor to the corresponding catalyst concentrate. Zone 4 may be considered a catalyst formation zone in which the sulfur-containing catalyst precursor concentrate of phosphomolybdic acid is converted to the solidmolybdenum-containing catalyst concentrate.

The catalyst concentrate is removed from heating zone 4 by line 24. At least a portion of the catalyst concentrate is introduced, via line 25, into line 26 which carries a carbonaceous chargestock comprising a hydrocarbon which may have the same boiling point range as the hydrocarbonaceous oil of line 10. The hydrocarbon may also comprise a single hydrocarbon (e.g., tetralin) or a mixture of hydrocarbons having the same, or different, boiling point range as the hydrocarbonaceous oil of line 10 or a different boiling point range from the hydrocarbonaceous oil of line 10. The carbonaceous chargestock may be a hydrocarbonaceous oil or coal in a hydrocarbon diluent. Suitable hydrocarbonaceous oil chargestocks include crude oils; mixtures of hydrocarbons boiling above 430° F., preferably above 650° F., for example, gas oils, vacuum residua, atmospheric residua, once-through coker bottoms, and asphalt. The hydrocarbonaceous oil chargestock may be derived from any source, such as petroleum, shale oil, tar sand oil, oils derived from coal liquefaction processes, including coal liquefaction bottoms, and mixtures thereof. Preferably, the hydrocarbonaceous oils have at least 10 wt. % materials boiling above 1050° F. More preferably, the hydrocarbonaceous oils have a Conradson carbon content ranging from about 5 to about 50 wt. %. Coal may be added to any of these oils. Alternatively, slurries of coal in a hydrocarbon diluent may be used as chargestock to convert the coal (i.e., coal liquefaction). The diluent may be a single type of hydrocarbon or a mixture of hydrocarbons and may be a light hydrocarbon or a heavy hydrocarbon, as described in U.S. Pat. No. 4,094,765, column 1, lines 54 to column 2, line 43, the teaching of which is hereby incorporated herein by reference.

When the chargestock, into which at least a portion of the catalyst concentrate is introduced, is an oil, the concentrate disperses in the oil. If the chargestock comprises coal in a diluent, the concentrate may be added to the diluent before, after, or simultaneously with the addition of coal to the diluent. A hydrogen-containing gas is introduced by line 27 into line 26. The mixture of carbonaceous chargestock, catalyst concentrate and hydrogen is passed into slurry hydroconversion zone 5. The catalyst concentrate of line 25 is added to the carbonaceous chargestock in an amount sufficient to provide from about 10 to about 2000 wppm, preferably from about 50 to 1000 wppm, more preferably from about 50 to 800 wppm molybdenum, and most preferably from about 50 to 300 wppm metal, calculated as the elemental metal, preferably molybdenum, based on the total hydroconversion zone chargestock, i.e., concentrate plus carbonaceous chargestock.

Suitable hydroconversion operating conditions are summarized below.

| Conditions | Broad Range | Preferred Range |
| --- | --- | --- |
| Temperature, °F. | 650 to 900 | 820 to 870 |
| H₂ Partial Pressure, psig | 50 to 5000 | 100 to 2500 |

The hydroconversion zone effluent is removed by line 28 and passed to a gas-liquid separation zone 6 wherein the normally gaseous phase is separated from a normally liquid phase. The gaseous phase is removed from separation zone 6 by line 30. Alternatively, the gaseous phase, which comprises hydrogen, may be recycled by line 32, preferably after removal of undesired constituents, to slurry hydroconversion zone 5 via line 27. The normally liquid phase, which comprises the molybdenum-containing catalytic solids and a hydroconverted hydrocarbonaceous oil product, is passed by line 34 to separation zone 7 for fractionation by conventional means, such as distillation into various fractions; such as light, medium boiling, and heavy bottoms fractions. The light fraction is removed by line 36. The medium boiling fraction is removed by line 38. The heavy bottoms fraction is removed by line 40, and, if desired, at least a portion of the bottoms fraction may be recycled to the hydroconversion zone.

Furthermore, if desired, the catalytic solids may be separated from the hydroconverted oil product and the separated solids may be recycled to the hydroconversion zone.

In a broader aspect of the instantly claimed invention, a metal compound (catalyst precursor), other than an aqueous solution of phosphomolybdic acid, is introduced into one or both of the mixing zones. Of course, if an aqueous solution is not used then there is no need for the drying step. The metal compound may be a compound or mixture of compounds as finely divided solids, or a compound or mixture of compounds as finely divided solids mixed with an organic liquid that is soluble in said hydrocarbonaceous oil, a compound or mixture of compounds that is soluble in the hydrocarbonaceous oil or a compound that is soluble in an organic compound (liquid medium) that can be dispersed in the hydrocarbonaceous oil. It can also be a compound that is water soluble and the resulting aqueous solution dispersed in the hydrocarbonaceous material. For example, the metal compound may be in a phenolic medium, in water, in alcohol, etc. Suitable metal compounds convertible (under preparation conditions) to solid, metal-containing catalysts include: (1) inorganic metal compounds such as carbonyls, halides, oxyhalides; polyacids such as isopolyacids and heteropolyacids (e.g., phosphomolybdic acid, and molybdosilicic acid); (2) metal salts of organic acids such as acyclic and cyclic aliphatic carboxylic acids and thiocarboxylic acids containing two or more carbon atoms (e.g., naphthenic acids); aromatic carboxylic acids (e.g., toluic acid); sulfonic acids (e.g., toluenesulfonic acid); sulfinic acids; mercaptans; xanthic acids; phenols, di-and polyhydroxy aromatic compounds; (3) organometallic compounds such as metal chelates, e.g., with 1,3-diketones, ethylenediamine, ethylenediaminetetraacetic acid, phthalocyanines, etc.; (4) metal salts of organic amines such as aliphatic amines, aromatic amines and quaternary ammonium compounds.

The metal constituent of the metal compound that is convertible to a solid, non-colloidal, metal-containing catalyst is selected from the group consisting of Groups IVB, VB, VIB, VIIB, and VIII, and mixtures thereof, of the Periodic Table of the Elements. The Periodic Table of Elements referred to herein is published by Sergeant-Welch Scientific Company being copyrighted in 1979 and available from them as Catalog Number S-18806. Non-limiting examples include zinc, antimony, bismuth, titanium, cerium, vanadium, niobium, tantalum, chromium, molybdenum, tungsten, manganese, rhenium, iron, cobalt, nickel and the noble metals including platinum, iridium, palladium, osmium, ruthenium, and rhodium. The preferred metal constituent of the metal compound is selected from the group consisting of molybdenum, tungsten, vanadium, chromium, cobalt, titanium, iron, nickel and mixtures thereof. Preferred compounds of the given metals include the salts of acyclic (straight or branched chain) aliphatic carboxylic acids, salts of cyclic aliphatic carboxylic acids, polyacids, carbonyls, phenolates and organoamine salts.

Such metal compounds are described in U.S. Pat. No. 4,295,995, the teachings of which are incorporated herein by reference. The preferred metal compounds are inorganic polyacids of metals selected from Groups VB, VIB, and mixtures thereof, that is, vanadium, niobium, chromium, molybdenum, tungsten, and mixtures thereof. Suitable inorganic polyacids include phosphomolybdic acid, phosphotungstic acid, phosphovanadic acid, silicomolybdic acid, silicotungstic acid, silicovanadic acid and mixtures thereof. The preferred polyacid is a phosphomolybdic acid. The terms "heteropolyacids" and "isopolyacids" are used herein in accordance with the definitions given in *Advanced Inorganic Chemistry*, 4th Edition, by S. A. Cotton and Geoffrey Wilkinson, Interscience Publishers, New York, pages 852–861.

The following examples are presented to illustrate the invention and should not be construed as limiting the invention.

EXAMPLE 1

Preparation of Catalyst Concentrate with Elemental S/Mo Atom Ratio of 5.2/1: Colloidal Sulfur Preblended with Cold Lake Crude, vehicle for preparation (Run R-2190-cp).

Step A—Dispersion of Sulfur in Cold Lake Crude

A 500 ml stainless steel beaker was charged with 99.23 g. of Cold Lake Crude oil that contained 50 wt. % components boiling above 975+° F., 12.9 wt. % Conradson Carbon and which exhibited an initial boiling point of 471° F. The beaker was then heated to 180°–200° F. and 0.77 g. of colloidal sulfur (a sublimed, pharmaceutical grade product supplied by Battelle-Renwick Company, lot 2195) was stirred into the oil and the mixture was held at 180°–200° F. for a period of 15 minutes.

Step B—Introduction of Aqueous Phosphomolybdic Acid

To a 300 cc stirred Autoclave Engineer's Autoclave was added 90.0 g. of the dispersion of sulfur in Cold Lake Crude that was prepared in Step A. After flushing with nitrogen the autoclave was heated to 176° F. and, with stirring, there was injected 9.99 g. of an aqueous solution of phosphomolybdic acid that contained 4.0 wt % Mo, and stirring was continued for 10 minutes at 176° F. The sulfur/molybdenum atom ratio in the mixture was 5.2/1. Phosphomolybdic acid solution was prepared by dissolving 1.60 g. crystalline acid (50 wt. % Mo, Fisher Scientific) in 18.4 g of deionized water at room temperature.

Step C—Removal of Water

Upon completion of the 10 minute stirred period at 176° F., the autoclave was heated to 300° F. and held at this temperature with stirring and with nitrogen flow-through at atmospheric pressure to remove water.

Step D—Formation of Catalyst Concentrate

The dry catalyst precursor concentrate obtained in Step C, was converted to catalyst concentrate by increasing the autoclave temperature to 725° F. and maintaining this temperature for a stirred contact period of 30 minutes. After venting autoclave pressure (some light hydrocarbon removed) and cooling to room temperature, there was obtained 78 g. of catalyst concentrate that contained 0.51 wt. % Mo.

This concentrate was assayed to determine formation of a solid molybdenum containing catalyst by the following procedure: a sample of 30 g. of this concentrate was diluted with 150 g. of toluene and filtered over a Number 2 Whatman paper. Recovered solids, after toluene washing and drying under vacuum at 212° F., amounted to 1.04 g. (3.47 wt. % catalyst solids in catalyst concentrate). The Mo content of the recovered solids was 14.7 wt. %.

EXAMPLE 2

Preparation of Catalyst Concentrate with Elemental S/Mo Atom Ratio of 2.6/1: Colloidal Sulfur Preblended with Cold Lake Crude (Run R-2291-cp).

The procedures of Example 1 were repeated except that the blend used in Step-A comprised 99.61 g. Cold Lake Crude and 0.39 g. colloidal sulfur, an amount of sulfur that provided a S/Mo atomic ratio of 2.6/1 in Step B.

There was obtained 76 g. of catalyst concentrate that contained 0.53 wt. % Mo and 2.9 wt. % toluene-insoluble catalyst solids. The Mo content of the solids was 18.5 wt. %.

EXAMPLE 3

Preparation of Catalyst Concentrate with Elemental S/Mo Atom Ratio of 7.6/1: Colloidal Sulfur Preblended with Cold Lake Crude (Run R-2285-cp).

The procedures of Example 1 were repeated except that the blend used in Step A comprised 98.85 g. Cold Lake Crude and 1.15 g. colloidal sulfur, an amount of sulfur that provided a S/Mo atomic ratio of 7.6/1 in Step B.

There was obtained 74 g. of catalyst concentrate that contained 0.54 wt. % Mo and 3.1 wt. % toluene-insoluble catalyst solids. The Mo content of the solids was 17.4 wt. %.

EXAMPLE 4

Preparation of Catalyst Concentrate with Elemental S/Mo Atom Ratio of 9.5/1: Colloidal Sulfur Preblended with Cold Lake Crude (Run R-2228-cp).

The procedures of Example 1 were repeated except that the blend used in Step A comprised 98.6 g. Cold Lake Crude and 1.40 g. colloidal sulfur, an amount of sulfur that provided a S/Mo atomic ratio of 9.5/1 in Step B.

There was obtained 80.0 g. of catalyst concentrate that contained 0.50 wt. % Mo and 3.2 wt. % catalyst solids. The Mo content of the solids was 15.6 wt. %.

EXAMPLE 5

Preparation of Catalyst Concentrate Without Addition of Elemental Sulfur (Run R-1958-cp).

The procedures of Example 1 were repeated except that colloidal sulfur was not added to Cold Lake Crude in Step A.

There was obtained 82 g. of catalyst concentrate that contained 0.49 wt. % Mo and 2.7 wt. % catalyst solids. The Mo content of the solids was 18.1 wt. %.

EXAMPLE 6

Preparation of Catalyst Concentrate with Elemental S/Mo Atom Ratio of 4.5/1: Colloidal Sulfur Preblended with Athabasca Bitumen (Run R-2515-cp).

Step A—Dispersion of Sulfur in Athabasca Bitumen

A 300 cc stirred Autoclave Engineer's Autoclave was charged with 0.68 g. of colloidal sulfur (same source as in Example 1) and 90.00 g. of an Athabasca bitumen that contained 13.87 wt. % Conradson Carbon and 67.70 wt. % of components boiling above 975° F. The autoclave was heated to 176° F. while stirring and was held at that temperature, with stirring, for 10 minutes.

Step B—Introduction of Aqueous Phosphomolybdic Acid

A solution of phosphomolybdic acid was prepared by dissolving 2.00 g. crystalline phosphomolybdic acid (Fisher Chemical) in 18.00 g. deionized water. Next, 9.0 g. of this solution, which contained 4.0 wt. % Mo, was injected into the autoclave while stirring, and stirring was continued for another 10 minutes at 176° F. The S/Mo atomic ratio of the blend was 4.5/1.

Step C—Removal of water

The procedure of Example 1 hereof was followed.

Step D—Formation of Catalyst Concentrate

The procedure of Example 1 was followed. There was obtained 82 g. of catalyst concentrate that contained 0.55 wt. % Mo and 5.3 wt. % catalyst solids. The Mo content of the solids was 10.4 wt. %.

EXAMPLE 7

Preparation of Catalyst Concentrate with Elemental S/Mo Atom Ratio of 4.5/1: Flowers of Sulfur Preblended with Athabasca Bitumen (Run R-2516-cp).

The procedures of Example 6 were repeated except that flowers of sulfur (B & A Chemicals) was substituted for colloidal sulfur.

There was obtained 78 g. of catalyst concentrate that contained 0.58 wt. % Mo and 7.0 wt. % catalyst solids. The Mo content of the solids was 8.3 wt. %.

EXAMPLE 8

Preparation of Catalyst Concentrate with Elemental S/Mo Atom Ratio of 5.2/1: Sulfur added After Drying Step C (Run R-2612-cp).

Steps A through C of Example 1 were repeated except that elemental sulfur was not added in Step A. In this mode, 10.0 g. of phosphomolybdic acid solution was added to 90 g. of Cold Lake Crude.

At the end of Step C, after removal of water and while continuing to stir at 300° F., 5.88 g. of a blend comprising 12.3 wt. % colloidal sulfur, 67.7 wt. % Cold Lake Crude and 20.0 wt. % toluene was added.

The autoclave temperature was then increased to 725° F. and Step D of Example 1 was repeated.

There was obtained 86 g. of catalyst concentrate that contained 0.47 wt. % Mo and 3.9 wt. % of catalyst solids. The Mo content of the solids was 12.1 wt. %.

EXAMPLE 9

Preparation of Catalyst Concentrate with Elemental S/Mo Atom Ratio of 5.2/1: Sulfur added in Mixture with Aqueous Phosphomolybdic acid (Run R-2611-cp).

The procedures of Example 1 were repeated except that Step A was omitted and colloidal sulfur was added in Step B in admixture with the aqueous phosphomolybdic acid solution.

In this modified procedure 10.0 g. of a mixture comprising 8.0 wt. % phosphomolybdic acid (Fisher Chemical, 50 wt. % Mo), 85.0 wt. % deionized water and 0.7 g. colloidal sulfur was injected into 90 g. of Cold Lake Crude while stirring at 176° F. in the 300 cc autoclave. The S/Mo atom ratio in this preparation was 5.2/1. Stirring was continued for 10 minutes at 176° F., as in Step B of Example 1.

The preparation of catalyst concentrate was completed according to the procedures of Steps C and D of Example 1. There was obtained 82 g. of catalyst concentrate that contained 0.49 wt. % Mo and 3 wt. % of catalyst solids. The Mo content of the solids was 16.3 wt. %.

EXAMPLE 10

Preparation of Catalyst Concentrate with Elemental S/Mo Atom Ratio of 5.7/1: Step D Carried Out At 750° F. (Run R-2562-cp).

The procedures of Example 6 were repeated with the following exceptions. In Step A, 0.86 g. of flowers-of-sulfur was blended with 89.14 g. of Athabasca Bitumen. Also, in Step B, 8.80 g. of phosphomolybdic acid solution was used, a solution that was comprised of 99.06 wt. % of an aqueous solution of phosphomolybdic acid (Prepared by Climax Molybdenum Company, Lot No. 1768-37, 5.18 wt. % Mo) and 0.84 wt. % phosphoric acid (85 wt. % acid, Fisher Chemical). The atomic ratio of added elemental S/Mo was 5.7/1.

There was obtained 76 g. of catalyst concentrate that contained 0.59 wt. % Mo and 6.0 wt. % catalyst solids. The Mo content of the solids was 9.8 wt. %.

EXAMPLE 11

Preparation of Catalyst Concentrate with Elemental S/Mo Atom Ratio of 5.7/1: Step D Carried Out at 690° F. (Run R-2534-cp).

Example 10 was repeated except that the temperature used in Step D to form the catalyst concentrate was 690° F.

There was obtained 88 g. of catalyst concentrate that contained 0.52 wt. % Mo and 4.9 wt. % of catalyst solids. The Mo content of the solids was 10.61 wt. %.

EXAMPLE 12

Preparation of Catalyst Concentrate with Elemental S/Mo Atom Ratio of 5.7/1: Step D Carried Out At 650° F. (Run R-2552-cp).

Example 10 was repeated except that the temperature used in Step D to form the catalyst was 650° F.

There was obtained 90 g. of catalyst concentrate that contained 0.50 wt. % Mo and 4.6 wt. % catalyst solids. The Mo content of the solids was 10.9 wt. %.

EXAMPLE 13

Preparation of Catalyst Concentrate with Elemental S/Mo Atom Ratio of 5.7/1: Step D Carried Out At 630° F. (Run R-2566-cp).

Example 10 was repeated except that the temperature used to form the catalyst in Step D was 630° F.

There was obtained 88 g. of catalyst concentrate that contained 0.51 wt. % Mo and 4.6 wt. % of catalyst solids. The Mo content of the solids was 11.1 wt. %.

COMPARATIVE EXAMPLE I

Preparation of Catalyst Concentrate Using Hydrogen Sulfide. Comparative Catalyst Prepared According to Methods Described in U.S. Pat. No. 4,740,489 (Run R-2535-cp).

Example 11 was repeated with the following exceptions: Step A was omitted (sulfur was not preblended with the Athabasca Bitumen) and following Step C, the autoclave was pressured to 100 psia with $H_2S$ and was held with stirring at 300° F. for 30 minutes. At this point, the autoclave was vented, flushed with nitrogen, sealed, and heated to 690° F. to complete Step D.

There was obtained 88 g. of catalyst concentrate that contained 0.52 wt. % Mo and 4.0 wt. % of catalyst solids. The Mo content of the solids was 11.8 wt. %.

EXAMPLE 14

Test of Catalyst of Example 1 for Hydroconversion Activity (Run R-2192-ft).

A hydroconversion experiment was carried out with a Cold Lake Crude vacuum bottoms feedstock that contained 23.76 wt. % Conradson Carbon, and 94.80 wt. % of components boiling above 975° F.

To a 300 cc stirred autoclave from Autoclave Engineers was charged 109.5 g. of vacuum Cold Lake bottoms, 5.59 g. of Cold Lake Crude (12.9 wt. % Conradson Carbon and 50 wt. % components boiling above 975° F.) and 4.91 g. of the catalyst concentrate of Example 1. This amount of catalyst concentrate was sufficient to provide a Mo concentration of 208 wppm on the total reactor charge, i.e. the combined weight of vacuum bottoms, Cold Lake Crude and catalyst concentrate. The autoclave was subsequently flushed with hydrogen, sealed and stirred for 10 minutes at 200° F. to mix the components.

Upon cooling to room temperature, the autoclave was charged to 1350 psig with hydrogen, and with stirring, the autoclave was heated to 725° F. and held at that temperature for a period of 20 minutes.

At this point, pressure in the autoclave was adjusted to 2100 psig, a flow of hydrogen was started through the autoclave to maintain a rate of 0.36 liter/min. (measured at the outlet at atmospheric pressure and ambient temperature after caustic scrubbing to remove $H_2S$), and the temperature was increased to 830° F. to carry out the hydroconversion run. Flow-through gas was collected and analyzed by mass spectrometry.

After 180 minutes of stirred contact at 830° F. at 2100 psig with 0.36 liter/min hydrogen flow, the flow was stopped and the autoclave was quickly cooled to 250° F. The volume of gaseous material was vented from the reactor at 250° F. and was measured by wet test meter at atmospheric pressure and room temperature after first scrubbing with caustic solution to remove $H_2S$. Gas composition was determined by mass spectrometry.

Liquid and solid products in the autoclave reactor, still at about 200° F. were filtered over a Number 2 Whatman filter paper to determine the yield of hot, oil insoluble solids (composite of catalyst, demetallization products and carbonaceous material). Filtered oil, after removal of 6.0 g. for analytical tests, was set aside for determination of toluene insoluble solids content. Liquid and solids remaining in the reactor after pouring out the hot oil contents were washed out with hot toluene and this wash was filtered by passing over the paper+- solids from the hot oil filtration step. Filtered toluene wash liquid was then added to the oil from hot filtration and additional toluene was added so that the total weight of toluene was about 360 g. After standing for one hour at room temperature, this toluene diluted sample was filtered over fresh Number 2 Whatman filter paper to recover toluene insoluble solids (carbonaceous material). Toluene filtrate, combined with toluene used to wash the hot-oil insoluble solids and toluene insoluble solids, was distilled to recover the 975+° F. bottoms product. Hot oil-insoluble solids and toluene insoluble solids were dried separately under oil-pumped vacuum for one hour at 212° F. prior to weighing.

In this manner, there were recovered 1.00 g. of hot-oil insoluble solids, 0.91 g. of toluene insoluble solids and 9.8 g. of 975+° F. bottoms, which bottoms contained 68.95 wt % Conradson Carbon components. Overall, the yield of solids (hot-oil insoluble plus toluene insoluble) amounted to 1.80 wt. % based on the weight of 975+° F. feed and conversion of 975+° F. to 975−° F. products was 88.9%.

Figure 2:
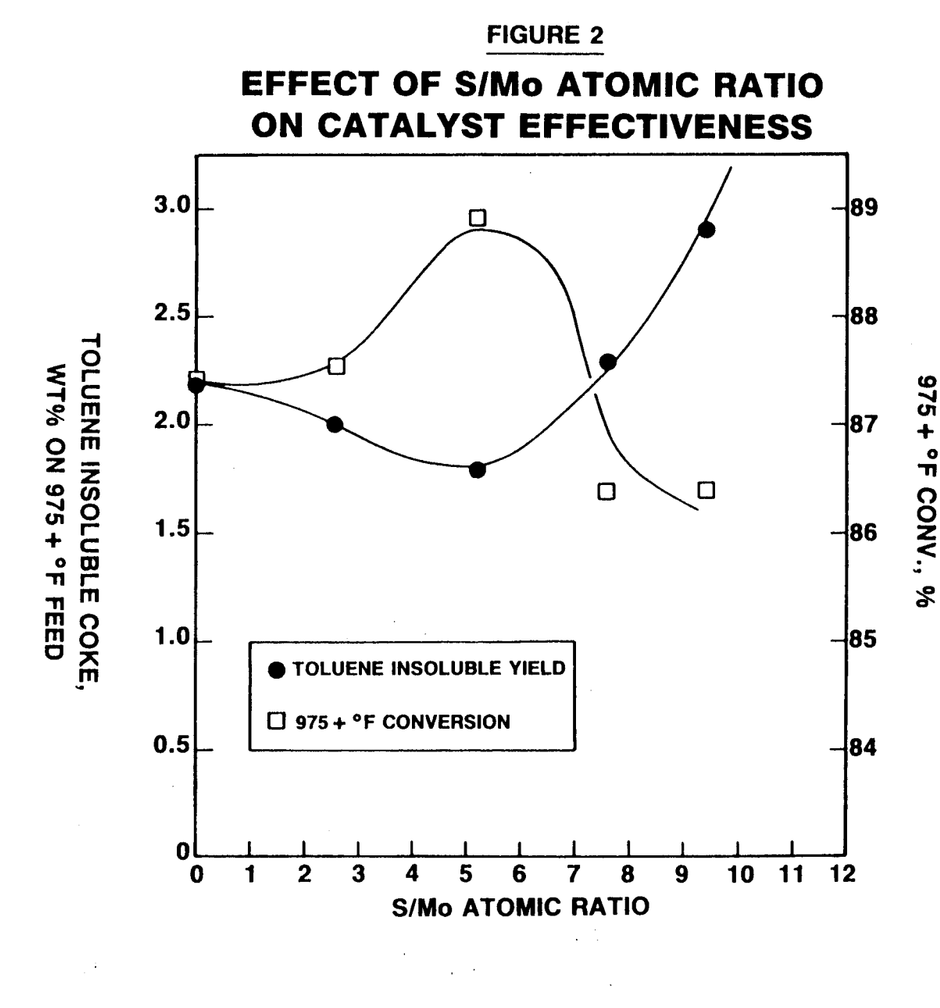
FIG. 2 is a plot of toluene insoluble coke yield on 975° F.+ feed and 975° F.+ conversion versus S/Mo atomic ratios in the catalyst concentrate for the catalyst materials of this invention when tested as hydroconversion catalysts.

To compare the effectiveness of this catalyst concentrate with those prepared at different S/Mo atom ratios, see Table I in Example 18 and FIG. 2.

EXAMPLE 15

Test of Catalyst of Example 2 for Hydroconversion Activity (Run R-2300-ft)

The catalyst concentrate of Example 2 was tested according to the procedure given in Example 14. The reactor charge consisted of 109.5 g. of vacuum Cold Lake Bottoms, 5.75 g. of Cold Lake Crude and 4.75 g. of the catalyst concentrate of Example 2. This amount of catalyst provided a Mo concentration of 208 wppm on the total reactor charge of feed and catalyst.

There were recovered 1.24 g. of hot oil-insoluble solids, 0.90 g. of toluene-insoluble solids and 11.2 g. of unconverted 975+° F. bottoms. Overall, the total yield of solids amounted to 2.00 wt. % on 975+° F. feed and conversion of 975+° F. bottoms to 975−° F. products was 87.5%.

To compare effectiveness of this catalyst concentrate with those prepared at different S/Mo atom ratios, see Table I and FIG. 2.

EXAMPLE 16

Test of Catalyst of Example 3 for Hydroconversion Activity (Run R-2288-ft)

The catalyst concentrate of Example 3 was tested according to the procedure given in Example 14. The reactor charge consisted of 109.5 g. of Cold Lake vacuum bottoms, 5.87 g. of Cold Lake Crude and 4.63 g. of the catalyst concentrate of Example 3. This amount of concentrate was sufficient to provide a Mo concentration of 208 wppm on total feed.

There were recovered 1.42 g. of hot oil-insoluble solids, 1.03 g. of toluene-insoluble solids and 12.1 g. of unconverted 975+° F. bottoms. Overall, the total yield of solids was 2.3 wt. % on 975+° F. feed and conversion of 975+° F. bottoms to 975−° F. products was 86.43%.

To compare the effectiveness of this catalyst with those prepared at different S/Mo atom ratios, see Table I in Example 18 and FIG. 2.

EXAMPLE 17

Test of Catalyst of Example 4 for Hydroconversion Activity (Run R-2230-ft).

The catalyst concentrate of Example 4 was tested according to the procedure given in Example 14. The reactor charge consisted of 109.5 g. of Cold lake vacuum bottoms, 5.50 g. of Cold Lake Crude and 5.00 g. of the catalyst concentrate of Example 4. This amount of concentrate provided 208 wppm Mo on total feed.

There were recovered 1.41 g. of hot oil-insoluble solids, 1.69 g. of toluene-insoluble solids and 11.2 g. of unconverted 975+° F. bottoms. Overall, the total solids yield was 2.9 wt. % on 975+° F. feed and the conversion of 975+° F. feed to 975−° F. products was 86.4%.

To compare effectiveness of this catalyst concentrate with those prepared at different S/Mo atom ratios see Table I in Example 18 and the curve in FIG. 2.

EXAMPLE 18

Test of Catalyst of Example 5 for Hydroconversion Activity (Run R-1961-ft).

The catalyst concentrate of Example 5 was tested according to the procedure given in Example 14. The reactor charge consisted of 109.5 g. of Cold lake vacuum bottoms, 5.60 g. Cold Lake Crude and 4.90 g. of the catalyst concentrate of Example 5. This amount of concentrate provided 208 wppm Mo on total feed.

There were recovered 2.36 g. of toluene-insoluble solids (oil insoluble solids recovered as part of toluene insolubles) and 11.4 g. of unconverted 975+° F. bottoms. Overall, the total yield of solids was 2.2 wt. % on 975+° F. feed and conversion of 975+° F. feed to 975−° F. products was 87.4%.

With reference to Table I, and to the curve shown in FIG. 2, it is apparent that catalyst concentrates that have maximum effectiveness, in terms of lowest solids yield (materials that could lead to reactor fouling) and highest conversion of 975+° F. feed into 975−° F. products, are obtained at S/Mo atom ratios above about 2.6/1 and below about 7.6/1.

TABLE I

| Effect of S/Mo Atom Ratio on Catalyst Performance | | | |
|---|---|---|---|
| | | Hydroconversion Performance | |
| Catalyst Concentrate | S/Mo Atom Ratio | Solids, Wt. % on 975°+ F. Feed | 975°+ F. Conv. to 975°− F. % |
| Example 1 | 5.2/1 | 1.8 | 88.9 |
| Example 2 | 2.6/1 | 2.0 | 87.5 |
| Example 3 | 7.6/1 | 2.3 | 86.4 |
| Example 4 | 9.4/1 | 2.9 | 86.4 |
| Example 5 | No added S | 2.2 | 87.4 |

EXAMPLE 19

Test of Catalyst of Example 6 for Hydroconversion Activity (Run R-2518-ft)

The catalyst concentrate of Example 6 was tested according to the procedure given in Example 14. The reactor charge consisted of 111.50 g. of Cold Lake vacuum bottoms, 5.03 g. of Cold Lake crude and 5.47 g. of the catalyst concentrate of Example 6. This amount of concentrate provided 246 wppm Mo on total feed.

There were recovered 1.57 g. of hot oil-insoluble solids, 0.63 g. toluene insoluble solids and 11.0 g. of unconverted 975+° F. bottoms. Overall, the total solids yield on 975+° F. feed was 1.99 wt. % and conversion of 975+° F. feed to 975−° F. products was 88.0%.

To compare the performance of the catalyst concentrate of Example 6 (a concentrate prepared with colloidal sulfur) with that of Example 7 (concentrate prepared with Flowers of sulfur) see Table II.

EXAMPLE 20

Test of Catalyst of Example 7 for Hydroconversion Activity (Run R-2522-ft).

The catalyst concentrate of Example 7 was tested according to the procedure given in Example 14. The reactor charge consisted of 111.10 g. of Cold Lake vacuum bottoms, 5.30 g. of Cold Lake Crude and 5.20 g. of the catalyst concentrate of Example 7. This amount of concentrate provided 248 wppm Mo on total feed.

There were recovered 1.40 g. of hot oil-insoluble solids, 0.73 g. of toluene-insoluble solids and 10.52 g. of unconverted 975+° F. vacuum bottoms. Overall, the total yield of solids was 1.94 wt. % on 975+° F. feed and conversion of 975+° F. to 975−° F. products was 88.5%.

As is apparent from the test results presented in Table II, catalyst prepared with Flowers of sulfur is equivalent, within the accuracy of test results, to catalyst prepared with colloidal sulfur.

TABLE II

| Comparison of Catalyst Concentrate Effectiveness | | | |
|---|---|---|---|
| | | Hydroconversion Performance | |
| Catalyst Concentrate | Type Sulfur | Solids, Wt. % on 975 + °F. Feed | 975 + F. Conv. to 975 − °F., % |
| Example 6 | Collodial | 1.99 | 88.0 |
| Example 7 | Flowers | 1.94 | 88.5 |

EXAMPLE 21

Test of Catalyst of Example 8 for Hydroconversion Activity (Run R-2614-ft).

The catalyst concentrate of Example 8 was tested according to the procedure given in Example 14. The reactor charge consisted of 109.5 g. Cold Lake vacuum bottoms, 5.12 g. Cold Lake Crude and 5.38 g. of the catalyst concentrate of Example 8. This amount of concentrate provided 208 wppm Mo on total reactor feed.

There were recovered 1.39 g. hot oil-insoluble solids, 0.76 g. toluene-insoluble solids and 9.57 g. of 975+° F. unconverted bottoms. Overall, the total yield of solids was 1.97 wt. % on 975+° F. feed and conversion of 975+° F. feed to 975−° F. products was 89.1%.

EXAMPLE 22

Test of Catalyst of Example 9 for Hydroconversion Activity (Run R-2613-ft).

The catalyst concentrate of Example 9 was tested for according to the procedure given in Example 14. The reactor charge consisted of 109.5 g. of Cold Lake vacuum bottoms, 5.37 g. of Cold Lake Crude and 5.13 g. of the catalyst concentrate of Example 9. This amount of concentrate provided 209 wppm Mo on total reactor feed.

There were recovered 1.69 g. of hot oil-insoluble solids, 1.13 g. of toluene-insoluble solids and 10.34 g. of unconverted 975+° F. bottoms. Overall, the total yield of solids was 2.59 wt. % on 975+° F. feed and conversion of 975+° F. feed to 975−° F. products was 87.3 wt. %.

EXAMPLE 23

Test of Catalyst of Example 10 for Hydroconversion Activity (Run R-2562-ft).

The catalyst concentrate of Example 10 was tested according to the procedure of Example 14. The reactor charge consisted of 109.5 g. of Cold Lake vacuum bottoms, 5.43 g. Cold Lake crude and 5.07 g. of the catalyst concentrate of Example 10. This amount of concentrate provided 250 wppm Mo on the total reactor feed.

There were recovered 1.55 g. of hot oil-insoluble solids, 1.03 g. of toluene-insoluble solids and 10.05 g. of unconverted 975+° F. bottoms. Overall, the total yield of solids was 2.37 wt. % on 975+° F. feed and conversion of 975+° F. feed to 975−° F. products was 88.6%.

Figure 3:
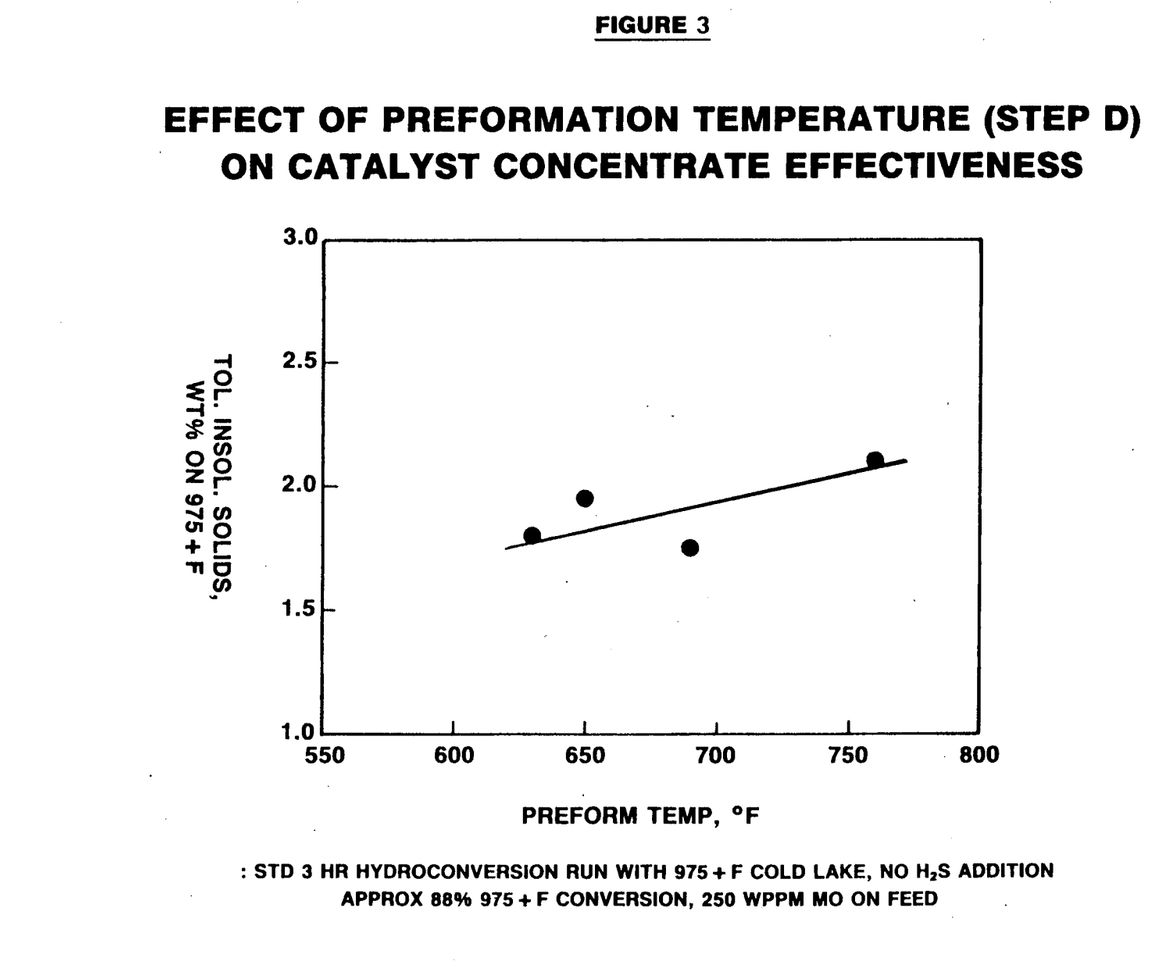
FIG. 3 is a plot of toluene insoluble coke yield versus preforming temperature (heating) used in forming the catalyst concentrates of this invention when tested under hydroconversion conditions.
Figure 4:
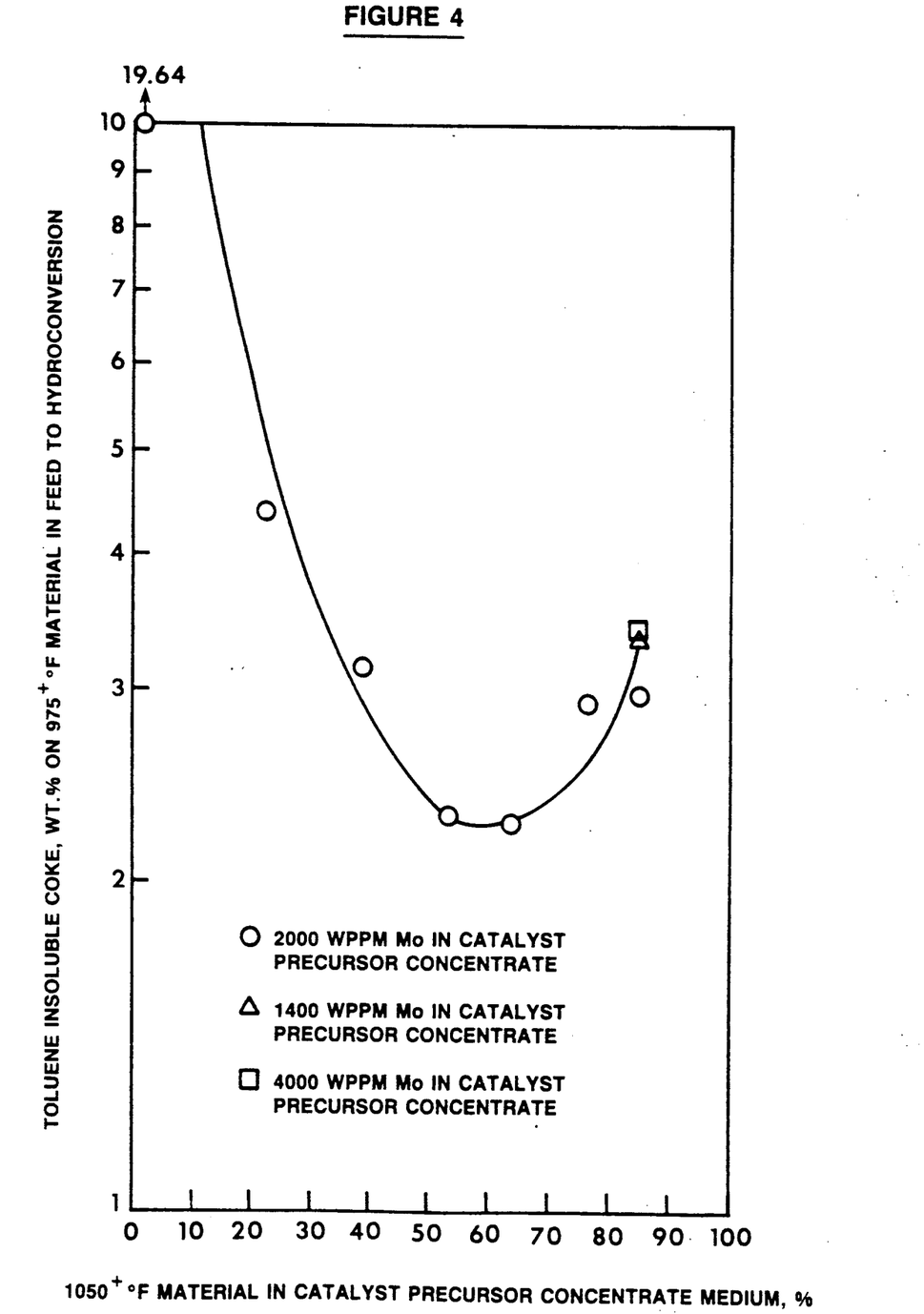
FIG. 4 is a plot of toluene insoluble coke vs. catalyst precursor concentrate composition for Comparative Example III and Examples 27 through 34. The plot demonstrates the advantages of employing a precursor concentrate containing from about 22 to 85 wt. % heavier oil with the balance being lighter oil.

To compare the performance of this catalyst concentrate with that of concentrates that had been prepared with different preforming temperatures (Step D of Example 1), see Table III and the plot in FIG. 3.

EXAMPLE 24

Test of Catalyst of Example 11 for Hydroconversion Activity (Run R-2536-ft).

The catalyst of Example 11 was tested according to the procedure of Example 14. The reactor charge consisted of 109.5 g. of Cold Lake vacuum bottoms, 4.63 g. of Cold Lake crude and 5.87 g. of the catalyst concentrate of Example 11. This amount of concentrate provided 250 wppm Mo on total reactor feed.

There were recovered 1.36 g. of hot oil-insoluble solids, 0.73 g. of toluene-insoluble solids and 7.95 g. of unconverted 975+° F. bottoms. Overall, the total yield of solids was 1.91 wt. % on 975+° F. feed and conversion of 975+° F. feed to 975−° F. products was 90.8 wt. %.

To compare the performance of this catalyst concentrate with that of concentrates that were prepared with different preforming temperatures (Step D, Example 1), see Table III and the plot in FIG. 3.

EXAMPLE 25

Test of Catalyst of Example 12 for Hydroconversion Activity (Run R-2554-ft).

The catalyst of Example 12 was tested according to the procedure of Example 14. The reactor charge consisted of 109.8 g. of Cold Lake vacuum bottoms, 4.63 g. Cold Lake crude and 5.87 g. of the catalyst concentrate of Example 12. This amount of concentrate provided 250 wppm Mo on total reactor feed.

There were recovered 1.47 g. of hot oil-insoluble solids, 0.89 g. of toluene-insoluble solids and 10.06 g. of unconverted 975+° F. bottoms. Overall, the total yield of solids was 2.11 wt. % on 975+° F. feed and conversion of 975+° F. feed to 975−° F. products was 88.6%.

To compare performance of this catalyst concentrate with that of concentrates that were prepared with different preforming temperatures (Step D of Example 1), see Table III and the plot in FIG. 3.

EXAMPLE 26

Test of Catalyst of Example 13 for Hydroconversion Activity (Run R-2571-ft).

The catalyst concentrate of Example 13 was tested according to the procedure of Example 14. The reactor charge consisted of 109.5 g. of Cold Lake vacuum bottoms, 4.63 g. of Cold Lake crude and 5.87 g. of the catalyst concentrate of Example 13. This amount of concentrate provided 250 wppm Mo on total reactor feed.

There were recovered 1.36 g. of hot oil-insoluble solids, 0.85 g. of toluene-insoluble solids and 10.3 g. of unconverted 975+° F. bottoms. Overall, the total yield of solids was 1.96 wt. % on 975+° F. feed and conversion of 975+° F. feed to 975−° F. products was 88.6 wt. %.

As can be seen from the tabulation in Table III and from the plot in FIG. 3, catalyst activity is better (lower yield of solids from hydroconversion) at lower preforming temperatures (Step D of Example 1). In view of these results, it is anticipated that shorter preforming times at the higher temperatures may also give catalysts of improved activity.

TABLE III

Comparison of Catalyst Concentrates: Effect of Preforming Temperature

| Catalyst Concentrate | Preforming Temp., °F. | Hydroconversion Performance | |
|---|---|---|---|
| | | Solids, Wt. % on 975 + °F. Feed | 975 + °F. Conv. to 975 − °F. % |
| Example 10 | 750 | 2.37 | 88.6 |
| Example 11 | 690 | 1.91 | 90.8 |
| Example 12 | 650 | 2.17 | 88.6 |
| Example 13 | 630 | 2.01 | 88.6 |

COMPARATIVE EXAMPLE II

Test of catalyst of Comparative Example I for Hydroconversion Activity (Run R-2537-ft).

The catalyst concentrate of Comparative Example I was tested according to the procedure of Example 14. The reactor charge consisted of 109.5 g. of Cold Lake vacuum bottoms, 4.63 g. of Cold Lake crude and 5.87 g. of the catalyst concentrate of Example 13. This amount of concentrate provided 250 wppm Mo on total reactor feed.

There were recovered 1.44 g. of hot oil-insoluble solids, 0.86 g. of toluene-insoluble solids and 9.52 g of unconverted 975+° F. bottoms. Overall, the total yield of solids was 2.10 wt. % on 975+° F. feed and conversion of 975+° F. feed to 975−° F. products was 89.1 wt. %.

Catalyst Precursor Concentrate Preparations A-G

To a 1 liter magnetically stirred autoclave was charged 392 g. of a hydrocarbonaceous medium comprised of various percentage compositions of 1050−° F. fraction and 1050+° F. fraction as set forth in Table IV below. These compositions were prepared by blending together the requisite proportions of Heavy Arabian vacuum gas oil and Heavy Arabian vacuum residuum. The autoclave was flushed with nitrogen and heated with stirring to 335° F. At this temperature, 8.0 g. of 20 wt. % MCB phosphomolybdic acid in phenol was injected and stirring continued for 40 min., after which the autoclave was cooled and discharged to give a catalyst precursor concentrate containing 2000 wppm Mo.

Catalyst Precursor Concentrate Preparation H (Run 379L)

A catalyst precursor concentrate containing 1400 wppm Mo was prepared according to the procedure of preparations A-G except that 394.4 g. of a heavy oil blend containing 85.4 wt. % material boiling above 1050° F. and 5.6 g. of 20 wt. % MCB phosphomolybdic acid in phenol was employed.

Catalyst Precursor Concentrate Preparation I (Run 376L)

A catalyst precursor concentrate containing 4000 wppm Mo was prepared according to the procedure for preparations A-G except that 384 g. of a heavy oil blend containing 85.4 wt. % material boiling above 1050° F. and 16.0 g. of 20 wt. % MCB phosphomolybdic acid in phenol was employed.

COMPARATIVE EXAMPLE III AND EXAMPLES 27 TO 32

The catalyst concentrate preparations G-H were tested for activity in suppressing coke formation under hydroconversion conditions as follows:

To a 300 cc magnetically stirred autoclave was charged 105.0 g. of Heavy Arabian Vacuum residuum containing 85.4 wt. % material boiling above 1050° F. and 15.0 g. of the respective catalyst precursor concentrate to give a Mo concentration of 250 wppm in the reaction medium. The autoclave was pressure tested with $H_2$, vented and charged with 100 psia $H_2S$ and then pressured to 1550 psig with $H_2$. The autoclave was heated with stirring to 830° F. and maintained at this temperature for 3 hrs. During the 3 hr reaction time the pressure was maintained at 2200 psig and $H_2$ flowed through the autoclave to maintain an exit gas rate of 0.26 l/min. as measured at room temperature by a wet test meter.

The autoclave was cooled and the contents washed out with 360 g. of toluene. The toluene solution was filtered to recover the toluene insoluble coke which was then dried in a vacuum oven at 160° C. for 1 hr.

The toluene insoluble coke yields for the several tests, expressed as wt. % coke on 975+° F. material in the charged feedstock (including that in the catalyst precursor concentrate), are tabulated in Table IV below.

EXAMPLE 33

Catalyst precursor concentrate preparation H was tested according to the procedure immediately above except that 21.43 g. of the catalyst precursor concentrate and 98.57 g. of Heavy Arabian vacuum residuum were charged to provide a molybdenum concentration of 250 wppm in the reaction medium. The toluene insoluble coke yield was 3.31 wt. % on 975+° F. material in the feed and is set forth in Table IV below.

EXAMPLE 34

Catalyst precursor concentrate preparation I was tested according to the above procedure except that 7.5 g. of the catalyst precursor concentrate and 112.5 g of Heavy Arabian vacuum residuum were charged to provide a molybedenum concentration of 250 wppm in the reaction medium. The toluene insoluble coke yield was 3.39 wt. % on 975+° F. material in the feed, which is set forth in Table IV below.

TABLE IV

| | Effect of Catalyst Precursor Concentrate Medium | | | | |
|---|---|---|---|---|---|
| | Catalyst Precursor Concentrate | | | | Toluene Insoluble |
| Example | Preparation Number | Mo, Wppm in Concentrate | Medium Composition 1050 + °F., Wt. % | Hydroconversion Test Run No. | Coke, Wt. % on 975 + °F. Material in Total Feed |
| Comparative Ex. III | A (370L) | 2000 | 1.6 | 909 | 19.64 |
| 27 | B (371L) | 2000 | 22.6 | 910 | 4.36 |
| 28 | C (378L) | 2000 | 39.3 | 930 | 3.13 |
| 29 | D (377L) | 2000 | 54.0 | 929 | 2.28 |
| 30 | E (375L) | 2000 | 64.5 | 928 | 2.24 |
| 31 | F (382L) | 2000 | 77.0 | 940 | 2.88 |
| 32 | G (383L) | 2000 | 85.4 | 941 | 2.93 |
| 33 | H (379L) | 1400 | 85.4 | 937 | 3.31 |
| 34 | I (376L) | 4000 | 85.4 | 936 | 3.39 |
| | Average of 383L, 379L, 376L | | 85.4 | — | 3.20 |

It is claimed:
1. In a process for preparing a sulfided catalyst concentrate, wherein:
   (a) a catalyst precursor concentrate is formed by mixing together: (i) a hydrocarbonaceous oil containing constituents boiling above about 1050° F. and (ii) a polyacid of molybdenum in an amount to provide from about 0.2 to 2 wt.% molybdenum, based on said hydrocarbonaceous oil;
   (b) the precursor concentrate is heated, in the substantial absence of added hydrogen, at a temperature from about 530° F. to about 800° F., and a total pressure of from about 0 psig to about 500 psig, for a time sufficient to convert said catalyst precursor to a solid molybdenum-containing catalyst;
   the improvement which comprises using a sulfiding agent which consists essentially of elemental sulfur at any stage of the process in an amount so that the atomic ratio of elemental sulfur to metal, of the metal compound is about 2/1 to 7/1.

2. The process of claim 1 wherein the polyacid of molybdenum is phosphomolybdic acid in an aqueous solution, and a drying step is added between step (a) and step (b).

3. The process of claim 1 wherein the elemental sulfur is added to the hydrocarbonaceous chargestock prior to addition of the polyacid of molybdenum.

4. The process of claim 2 wherein the elemental sulfur is added to the hydrocarbonaceous chargestock prior to addition of the phosphomolybdic acid.

5. The process of claim 4 wherein the hydrocarbonaceous oil of step (a) is a blend of a lighter oil with at least about 10 wt. % heavier oil, said lighter oil boiling below about 1050° F. and said heavier oil boiling above about 1050° F.

6. The process of claim 5 wherein the blend contains from about 22 to 85 wt. % heavier oil.

7. The process of claim 6 wherein the blend contains from about 30 to 85 wt. % heavier oil.

8. The process of claim 7 wherein the blend contains from about 45 to 75 wt. % heavier oil.

9. The process of claim 2 wherein the hydrocarbonaceous oil of step (a) comprises a blend of gas oil and a vacuum residuum.

10. The process of claim 2 wherein the hydrocarbonaceous oil of step (a) is an atmospheric distillation residuum.

11. The process of claim 2 wherein the amount of phosphomolybdic acid is such that it provides from about 0.2 to 1 wt. % Mo, based on said hydrocarbonaceous oil.

12. The process of claim 4 wherein the amount of sulfur is such that the atomic ratio of sulfur to molybdenum is from about 3/1 to 6/1.

13. The process of claim 1 wherein the amount of polyacid of molybdenum is such that it provides from about 0.2 to 1 wt. % Mo, based on said hydrocarbonaceous chargestock, and wherein the elemental sulfur is added as a concentrate in hydrocarbonaceous oil and is added to the precursor concentrate of step (a) prior to heating of step (b).

14. The prrcess of claim 12 wherein the amount of phosphomolybdic acid is such that it provides from about 0.2 to 1 wt. % Mo, based on said hydrocarbonaceous chargestock, and wherein the elemental sulfur is added as a concentrate in hydrocarbonaceous oil and is added to the precursor concentrate of step (a) prior to heating of step (b).

15. The process of claim 1 wherein the sulfur is in the form of a sublimed powder.

16. The process of claim 12 wherein the sulfur is in the form of a sublimed powder.

17. The process of claim 2 wherein the heating of step (b) is conducted at a temperature from about 600° F. to about 775° F.

18. The process of claim 12 wherein the heating step (b) is conducted at a temperature from about 600° F. to about 775° F.

19. The process of claim 2 wherein the amount of phosphomolybdic acid is such that it provides from about 0.2 to 1 wt. % Mo, based on said hydrocarbonaceous chargestock; the heating step (c) is performed at a temperature from about 600° to 775° F., and wherein the elemental sulfur is added as a concentrate in hydrocarbonaceous oil and is added to the precursor concentrate: (a) prior to introduction of the precursor concentrate into the heating zone of step (iii), or (b) in said heating zone.

* * * * *